United States Patent
Aoyama et al.

[11] Patent Number: 5,195,779
[45] Date of Patent: Mar. 23, 1993

[54] MOTOR VEHICLE BODY STRUCTURE EMPLOYING SANDWICHED STRUCTURAL BODY

[75] Inventors: Tadatoshi Aoyama; Suguru Yoshida; Masanori Suganuma; Takashi Chirifu, all of Tochigi, Japan

[73] Assignee: Honda Giken Kogyo Kabushiki Kaisha, Tokyo, Japan

[21] Appl. No.: 688,636

[22] Filed: Apr. 19, 1991

Related U.S. Application Data

[63] Continuation-in-part of Ser. No. 446,429, Dec. 5, 1989, Pat. No. 5,060,975.

[30] Foreign Application Priority Data

Apr. 20, 1990 [JP] Japan ................ 2-42209[U]
Apr. 25, 1990 [JP] Japan ................ 2-44404[U]

[51] Int. Cl.⁵ .............................................. B62D 21/15
[52] U.S. Cl. ................................... 280/784; 280/785; 296/901; 296/203; 296/205; 403/192; 403/199
[58] Field of Search ............... 280/781, 784, 785, 788; 296/29, 901, 203, 205; 52/415, 418, 426; 403/192, 199

[56] References Cited

U.S. PATENT DOCUMENTS

| | | | |
|---|---|---|---|
| 3,856,324 | 12/1974 | Saitoh | 280/784 |
| 3,888,502 | 6/1975 | Felzer et al. | 280/784 |
| 4,559,274 | 12/1985 | Kloppe et al. | |
| 4,573,707 | 3/1986 | Pabst | |
| 5,060,975 | 10/1991 | Sano et al. | 280/785 X |

FOREIGN PATENT DOCUMENTS

| | | | |
|---|---|---|---|
| 2360459 | 3/1978 | France | |
| 483446 | 7/1953 | Italy | 296/205 |
| 46-36329 | 10/1971 | Japan | |
| 47-32521 | 11/1972 | Japan | |
| 55-43912 | 11/1980 | Japan | |
| 57-114774 | 7/1982 | Japan | |
| 62-166136 | 10/1987 | Japan | |
| 62-174935 | 11/1987 | Japan | |
| 62-174978 | 11/1987 | Japan | |
| 63-30276 | 2/1988 | Japan | |

*Primary Examiner*—H. Grant Skaggs
*Assistant Examiner*—Carol Lynn Druzbick
*Attorney, Agent, or Firm*—Irving M. Weiner; Joseph P. Carrier; Pamela S. Burt

[57] ABSTRACT

A motor vehicle body structure has a pair of side frames each comprising a core layer having opposite surfaces and a pair of outer skin layers covering the opposite surfaces, a motor vehicle component, and joints disposed between the side frames and the motor vehicle component, for joining the motor vehicle component to the side frames through surface-to-surface contact therebetween.

20 Claims, 6 Drawing Sheets

MOTOR VEHICLE BODY STRUCTURE EMPLOYING SANDWICHED STRUCTURAL BODY

This application is a continuation-in-part of co-pending application Ser. No. 07/446,429, filed Dec. 5, 1989 (now U.S. Pat. No. 5,060,975).

BACKGROUND OF THE INVENTION

1. Field of the Invention

The present invention relates to a motor vehicle body structure employing a sandwiched structural body which comprises a core layer whose opposite surfaces are covered with outer skin layers.

2. Description of the Relevant Art

Composite structural bodies mainly made of synthetic resin or reinforced plastic, instead of steel sheets, have recently been proposed and used in motor vehicle bodies for the purposes of reducing the weight of motor vehicles and also increasing productivity of motor vehicles.

Such composite structural bodies are generally in the form of a sandwiched structural body comprising a core layer whose opposite surfaces are covered with outer skin layers. The core layer may be made of foamed plastic (see, for example, Japanese Patent Publications Nos. 46-36329 and 55-43912, Japanese Laid-Open Utility Model Publication No. 63-30276, U.S. Pat. Nos. 4,559,274 and 4,573,707), or of a honeycomb structure (see, for example, Japanese Laid-Open Patent Publication No. 47-32521, Japanese Laid-Open Utility Model Publications Nos. 57-114774, 62-174935, and 62-174978). It has also been proposed to use, as a motor vehicle body, a sandwiched structural body with a hollow space in a core layer, as disclosed in Japanese Laid-Open Utility Model Publication No. 62-166136, for example.

Modern motor vehicles such as automobiles mostly have a monocoque body that combines a frame and a body together and which serves as a frame for bearing applied external forces as they are distributed over the entire monocoque body. The monocoque body is advantageous in that the entire motor vehicle weight is reduced, and the motor vehicles can be produced at an increased production rate and with less cost.

Therefore, it is preferable that motor vehicle bodies in the form of composite structural bodies of synthetic resin, reinforced plastic or the like be also of a monocoque structure for reduced motor vehicle weight and increased productivity. Demands for composite structural bodies as monocoque motor vehicle bodies are growing.

However, if a monocoque motor vehicle body were assembled from a plurality of components in the form of sandwiched composite structural bodies mainly of synthetic resin, as with conventional steel sheets or the like, then the assembled monocoque body would not be sufficiently mechanically strong, durable, and shock-resistant.

There has been proposed a joint structure for joining a floor panel and a pair of side frames in a basic frame assembly for a motor vehicle body structure, the floor panel and the side frames being in the form of sandwiched structural bodies, as disclosed in Japanese Utility Model Application No. 1-72061.

Although each of the components of the proposed frame assembly is sufficiently mechanically strong, durable, and shock-resistant, it is desired that the assembled motor vehicle body structure should be of higher rigidity against torsional and bending stresses.

Furthermore, the assembled motor vehicle body structure should also be strong enough to support various mechanical components including front suspension beams, upper arms, and an engine with sufficient mechanical strength, and to have increased shock resistance in various body regions.

In view of the foregoing demands, there have been proposed component attachment structures of a motor vehicle body in the form of sandwiched structural bodies, i.e., component attachment structures for front suspension beams, front suspension upper arms, and an engine (see U.S. patent application Ser. No. 446,429 filed Dec. 5, 1989 now U.S. Pat. No. 5,060,975, and European Patent Application No. 89312811.6 filed Dec. 8, 1989).

SUMMARY OF THE INVENTION

It is an object of the present invention to provide a motor vehicle body structure in the form of a sandwiched structural body mainly made of synthetic resin, the motor vehicle body structure being of higher rigidity against torsional and bending stresses.

Another object of the present invention is to provide a motor vehicle body structure which allows various components to be attached, such as in a front frame region, with high mechanical strength, and which increases the mechanical strength and shock resistance of a motor vehicle that incorporates the motor vehicle body structure.

To achieve the above objects, according to the present invention, a motor vehicle body structure has a pair of side frames each comprising a core layer having opposite surfaces and a pair of outer skin layers covering the opposite surfaces. The side frames are interconnected by joints through a connector in supporting relationship to each other. The motor vehicle body structure thus constructed is highly rigid against torsional and bending stresses produced by external forces applied thereto.

The side frames have integral protrusions extending laterally, the joints being joined to surfaces of the protrusions. The joints comprise a pair of holders having joint surfaces which are complementary in shape to the surfaces of the protrusions.

To install a plurality of components on certain regions of the motor vehicle body structure, brackets (as the joints) are attached to the side frames, and the components are attached to the brackets. Such component attachments are of increased mechanical strength, and the brackets actually serve as reinforcements in the component attachments.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
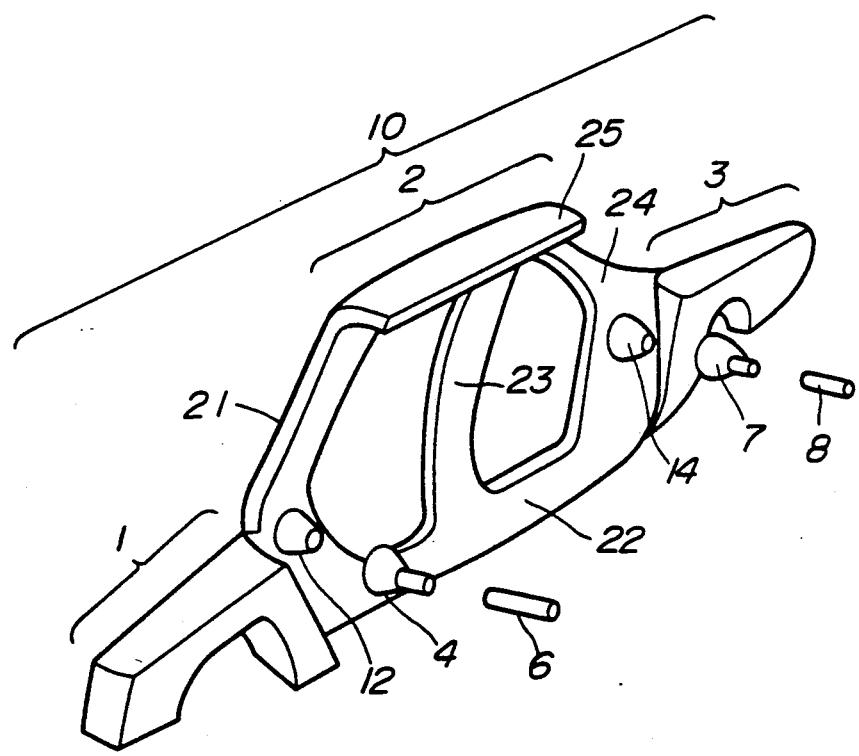
FIG. 1 is a perspective view of a motor vehicle body structure according to an embodiment of the present invention.

FIG. 1 shows a motor vehicle body structure according to an embodiment of the present invention. In FIG. 1, only a righthand side frame of the motor vehicle body structure is shown as the motor vehicle body structure is symmetrical in shape with respect to its longitudinal axis.

The side frame, generally denoted at 10, comprises a front member 1, a middle member 2, and a rear member 3 which are integrally joined together. The middle member 2 has a front pillar 21, a side sill 22, a center pillar 23, a rear pillar 24, and a side roof rail 25.

Figure 2:
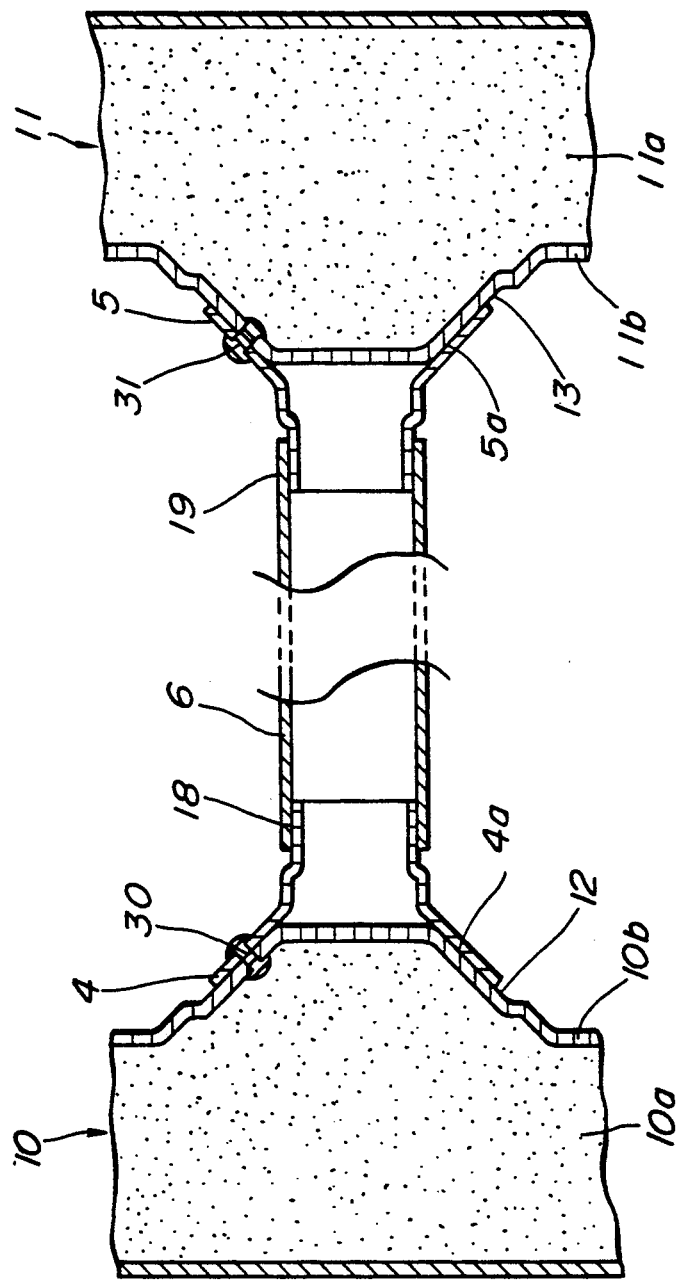
FIG. 2 is an enlarged fragmentary cross-sectional view of a portion of the motor vehicle body structure shown in FIG. 1.

As shown in FIG. 2, the righthand side frame 10 and a lefthand side frame 11 are in the form of respective sandwiched structural bodies which comprise respective core layers 10a, 11a whose opposite surfaces are covered with outer skin layers 10b, 11b, respectively. The outer skin layers 10b, 11b may be made of any of various synthetic resins, but should preferably be made of fiber-reinforced plastic. The matrix material of such fiber-reinforced plastic should preferably be thermoplastic resin because it has good formability, i.e., can well be formed into complex shapes. The core layers 10a, 11a may be made of foamed plastic, or in the form of a honeycomb core, or have a hollow space therein, but should preferably be made of foamed plastic, particularly, polyurethane foam, in view of its good formability and increased mechanical strength. In those motor vehicle body components where less stress concentration is expected and no strength problem appears to happen, the core layers may be of a hollow structure. The motor vehicle body structure of such a hollow core arrangement is also quite advantageous according to the present invention.

As shown in FIG. 1, the side frame 10 has a front frustoconical protrusion 12 integrally projecting laterally inwardly from a side surface of the side frame 10, i.e., from a boundary region between the front pillar 21 and the front member 1, and a rear frustoconical protrusion 14 integrally projecting laterally inwardly from a side surface of the side frame 10, i.e., a boundary region between the rear pillar 24 and the rear member 3. To the protrusions 12, 14, there are joined respective front and rear holders 4, 7 which are connected by respective front and rear connectors 6, 8, thus connecting the righthand side frame 10 to the lefthand side frame 11 (FIG. 2).

Figure 3:
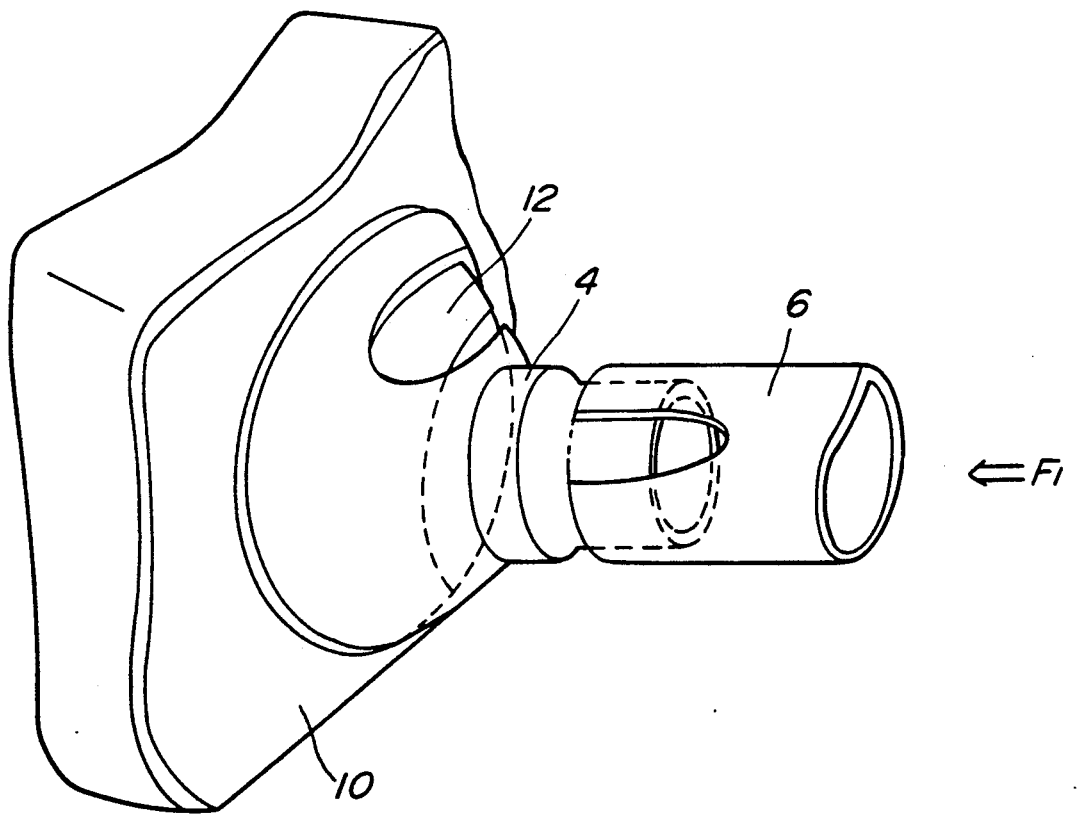
FIG. 3 is a perspective view, partly cut away, of a righthand front joint of the motor vehicle body structure shown in FIG. 1.

The front and rear protrusions and the holders joined thereto, which provide reinforced structures, are identical in basic structure. Therefore, only the front protrusions of the side frames 10, 11 and the associated holders are shown in FIG. 2. FIG. 3 shows only the front protrusion 12 of the righthand side frame 10 and the front holder 4 joined thereto as the front protrusion of the lefthand side frame and the front holder joined thereto are identical in shape.

As shown in FIG. 2, the lefthand side frame 11 also has a front frustoconical protrusion 13, with a front holder 5 joined thereto. The front holders 4, 5 have frustoconical joint surfaces 4a, 5a complementary in shape to the front protrusions 12, 13, respectively, and fastened to outer surfaces of the front protrusions 12, 13 by rivets 30, 31, respectively. The rivets 30, 31 extend through the front holders 4, 5 and the outer skin layers 10b, 11b of the sandwiched structural bodies of the side frames 10, 11, and have pressed and hammered heads clamping the front holders 4, 5 and the outer skin layers 10b, 11b therebetween. An adhesive may also or alternatively be used to bond the front holders 4, 5 to the front protrusions 12, 13 and also the connector 6 to the front holders 4, 5.

The front holders 4, 5 have respective tubular fitting portions 18, 19 extending inwardly from the joint surfaces 4a, 5a, respectively. The front connector 6, which is of a tubular shape, has opposite ends fitted respectively over and joined to the tubular fitting portions 18, 19. Therefore, the side frames 10, 11 are coupled to each other i supporting relationship to each other by the front holders 4, 5 and the connector 6.

The reinforced body structure shown in FIG. 2 is effective to withstand external forces applied in various directions to the motor vehicle body structure. For example, when external forces are applied laterally to the side frame 10, the structure shown in FIG. 2 is mechanically strong enough to resist such lateral external forces because the connector 6 between the side frames 10, 11 is sufficiently rigid against compressive forces. Since the front protrusions 12, 13 and the joint surfaces 4a, 5a of the front holders 4, 5 are frustoconical in shape, when a compressive force F1 (FIG. 3) is transmitted from the connector 6 through the front holder 4 to the side frame 10, the applied force F1 is divided into a compressive force and a shearing force by the front frustoconical protrusion 12, and these divided forces are distributed over the side frame 10. Therefore, the structure shown in FIG. 2 is mechanically strong against laterally applied external forces.

The connector 6 between the side frames 10, 11 is also rigid against external forces such as torsional or bending forces. Accordingly, the motor vehicle body is of increased rigidity against such external forces. The frustoconical joint surfaces 4a, 5a of the front holders 4, are also effective to divide and distribute torsional or bending forces, which are applied from the connector 6 and the front holders 4, 5, over the side frames 10, 11. The rigidity of the motor vehicle body is thus very high against torsional or bending stresses.

While only the front protrusions 12, 13, the front holders 4, 5, and the front connector 6 are described by way of example, the rear protrusions, the rear holders, and the rear connector are of the same structure and joined together in the same manner for high mechanical strength and rigidity against various external forces.

A steering column (not shown) may be mounted on the front connector 6. Since the front connector 6 is rigid, external forces applied through the steering column to the front connector 6 are sufficiently resisted by the front connector 6, and hence the motor vehicle body is of increased rigidity against such external forces. The frustoconical joints between the side frames 10, 11 and the front holders 4, 5 are effective to divide and distribute external forces, which are applied through the steering column to the motor vehicle body, over the side frames 10, 11 through the front connector 6 and the front holders 4, 5. The motor vehicle body therefore has increased rigidity against such external forces.

In the above embodiment, each of the side frames 10, 11 is of a unitary structure. However, the front member 1, the middle member 2, and the rear member 3 of each of the side frames 10, 11 may be separate from each other.

In the above embodiment, there are front and rear reinforced structures respectively in the boundary regions between the front pillar 21 and the front member 1 and between the rear pillar 24 and the rear member 3. However, the position and number of such reinforced structures, the configurations of their portions where components are attached, and the dimensions of such components may be determined depending on the magnitude and direction of external forces to be applied, and the degree of motor vehicle body rigidity to be achieved. The motor vehicle body rigidity may freely be varied by varying the dimensions of the joints between the holders and the protrusions and the joints between the holders and the connector.

While the pair of holders and the connector are separate from each other in the illustrated embodiment, one of the paired holders may be integral with the connector, or both of the paired holders may be integral with the connector.

The holders and the connector may be made of sheet steel or the like, but should preferably be made of synthetic resin from the standpoint of achieving reduced weight, and particularly should be made of fiber-reinforced plastic.

The rivets by which the protrusions of the side frames and the holders are fastened to each other may be effectively used as temporary fasteners until an adhesive by which the protrusions and the holders are bonded to each other is hardened, or may be effective as additional fasteners after such an adhesive is hardened. Similarly, rivets may be used as temporary fasteners until an adhesive by which the holders and the connector are bonded to each other is hardened. Other fasteners than the rivets may be employed as the temporary fasteners or additional fasteners.

A motor vehicle body structure according to another embodiment will be described below with reference to FIGS. 4 through 9.

Figure 4:
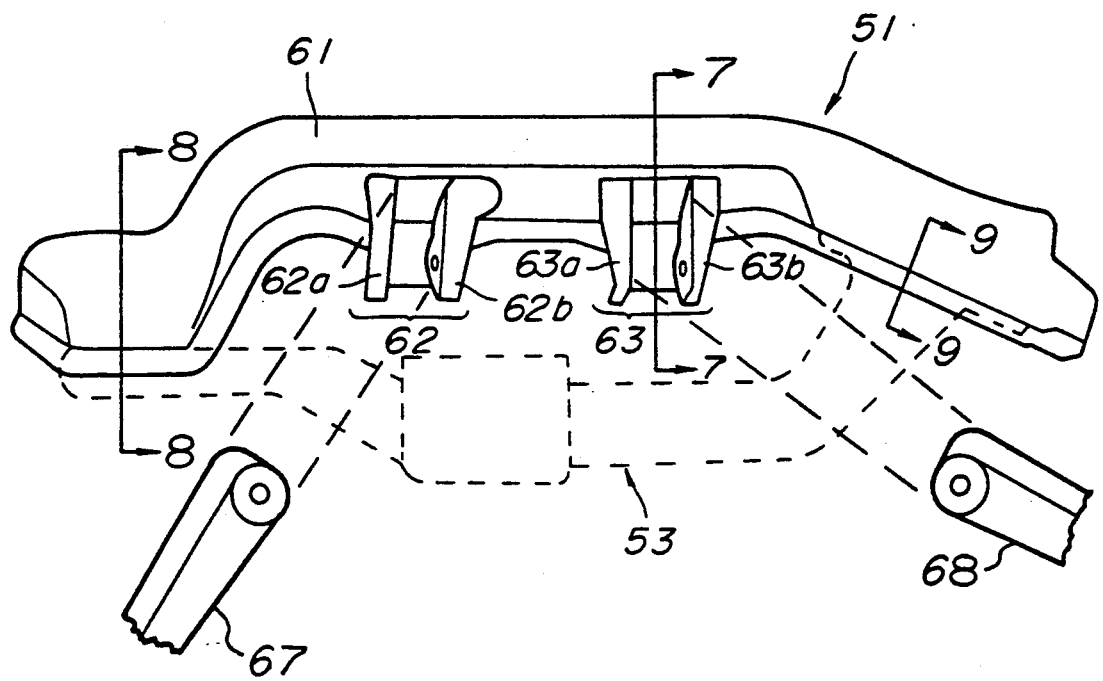
FIG. 4 is a side elevational view of a bracket for use in a motor vehicle body structure according to another embodiment of the present invention.

FIG. 4 shows a bracket 51 for installing a front suspension beam, front suspension upper arms, and an engine. The bracket 51 is fixed to a lower portion (shown shaded in FIG. 5) of a front member 70 of a side frame 52 in the form of a sandwiched structural body.

The bracket 51 comprises a base plate 61 and a plurality of side plates 62a, 62b, 63a, 63b. The base plate 61 is fixed to an outer surface of the side frame 70, and has a joint surface 61a (see FIG. 7) complementary in shape to the outer surface of the side frame 70.

The side plates 62a, 62b, 63a, 63b extend outwardly from the base plate 61. The side plates 62a, 62b jointly serve as a component attachment 62, and the side plates 63a, 63b jointly serve as another component attachment 63. Components may be attached to the component attachments 62, 63 by inserting pins on ends of the components into holes defined in the side plates 62a, 62b, 63a, 63b or using suitable fasteners such as bolts. To the component attachments 62, 63, there are attached ends of upper arms 67, 68 of a front suspension. As shown in dotted lines in FIG. 4, a front suspension beam 53 is also attached to the bracket 51 by an attachment structure, described later on.

Figure 6:
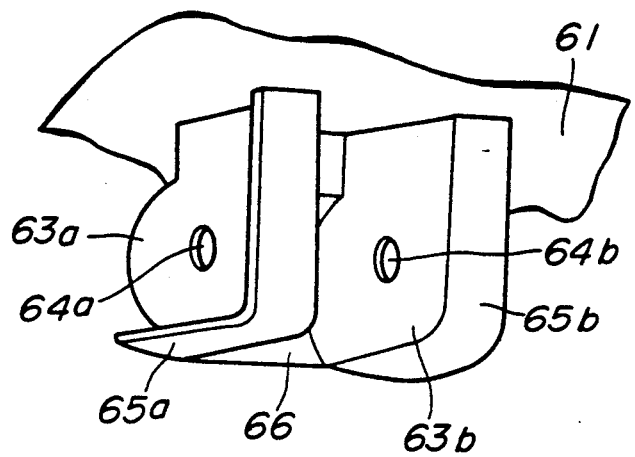
FIG. 6 is an enlarged fragmentary perspective view of a component attachment of the bracket shown in FIG. 4.

FIG. 6 shows the component attachment 63 at enlarged scale. The two side plates 63a, 63b are spaced from each other and extend parallel to each other, and project perpendicularly from the base plate 61. The side plates 63a, 63b have respective attachment holes 64a, 64b defined therein at confronting positions. The side plates 63a, 63b also have respective flanges 65a, 65b, and are interconnected and reinforced by a back plate 66. The component attachment 62 shown in FIG. 4 is identical in structure to the component attachment 63 shown in FIG. 6.

Figure 5:
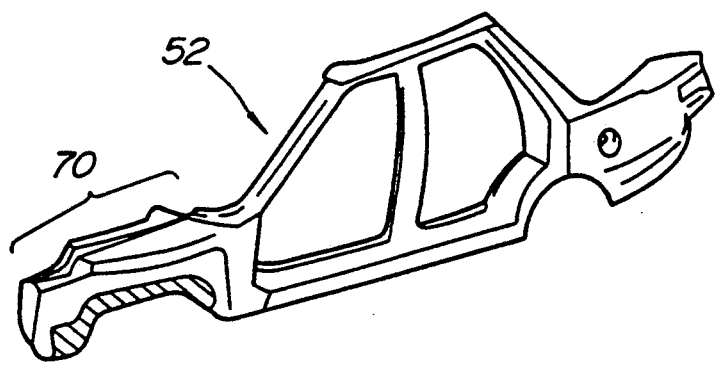
FIG. 5 is a perspective view of a side frame of a motor vehicle, on which the bracket shown in FIG. 4 is to be mounted.
Figure 7:
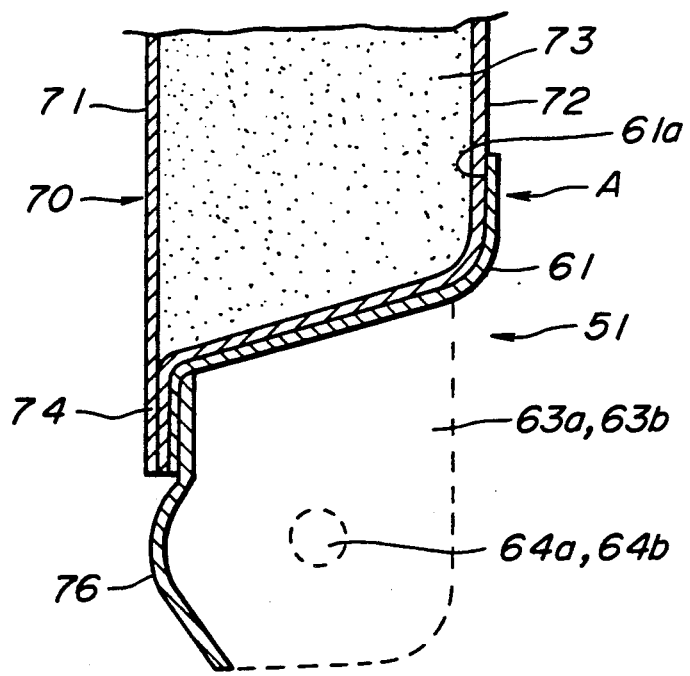
FIG. 7 is a cross-sectional view taken along line 7—7 of FIG. 4.

In FIG. 7, the bracket 51 is joined to the front member 70 of the side frame 52 shown in FIG. 5.

The front member 70 is in the form of a sandwiched structural body comprising a core layer 73 covered with a pair of outer skin layers 71, 72. The outer skin layers 71, 72 have lower ends joined to each other into a flange 74. The joint surface 61a of the base plate 61 is snugly held against and fixed to the corresponding surface of the front member 70. The bracket 51 may be secured to the front member 70 by an adhesive or fasteners such as rivets, but preferably by both an adhesive and fasteners. Rivets may be applied to a portion A in FIG. 7

Figure 8:
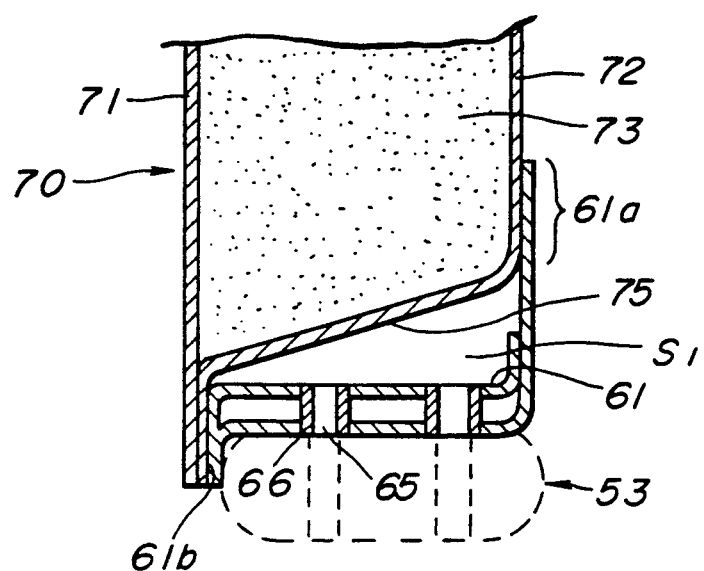
FIG. 8 is a cross-sectional view taken along line 8—8 of FIG. 4.

The front suspension beam 53 is installed by an attachment structure as follows:

FIG. 8 also shows the bracket 51 which is joined to the front member 70 of the side frame 52, and illustrates an attachment structure for the front end of the front suspension beam 53. In the illustrated region, the front member 70 has a lower surface 75 spaced from the base plate 61 of the bracket 51 with a space S1 defined therebetween. The base plate 61 has a plurality of attachment holes 65 in a central area thereof, and collars 66 are mounted respectively in the attachment holes 65. The front suspension beam 53 is fastened to the bracket 51 by bolts or the like extending through the attachment holes 65. The space S1 serves to accommodate the heads of the bolts or nuts threaded over the bolts.

Figure 9:
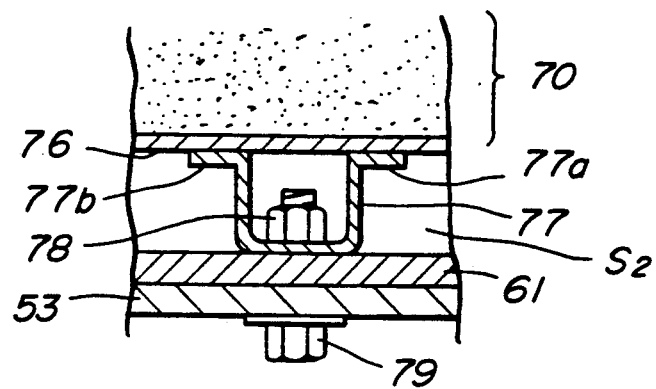
FIG. 9 is a cross-sectional view taken along line 9—9 of FIG. 4.

FIG. 9 also shows the bracket 51 which is joined to the front member 70 of the side frame 52, and also illustrates an attachment structure for the rear end of the front suspension beam 53. In the illustrated region, a space S2 defined between a lower surface 76 of the front member 70 and the base plate 61 of the bracket 51 accommodates a bracket 77 which houses a nut therein. The bracket 77 has flanged ends 77a, 77b bonded to the lower surface 76 of the front member 70. The front suspension beam 53 is fastened to the base plate 61 by a bolt 79 and a nut 78, the nut 78 being accommodated in the bracket 77. The bracket 77 doubles as a spacer for keeping the front member 70 and the base plate 61 spaced from each other and also a stiffener for stiffening the front member 70 and the base plate 61.

The nuts (for example, the nut 78 shown in FIG. 9) used to fasten the front suspension beam 53 to the bracket 51 as shown in FIGS. 8 and 9 should preferably be so-called floating nuts to facilitate the installation of the front suspension beam 53 on the bracket 51.

In the embodiment shown in FIGS. 4 through 9, the component attachments have increased mechanical strength. With the component attachments 62, 63 used, it is not necessary to form recesses in the motor vehicle body for respective components to be installed, and hence the mechanical strength of the motor vehicle body is not lowered. Since the base plate 61 of the bracket 51 is snugly fixed to the wide surface of the front member 70, the bracket 51 serves as a reinforcement. The motor vehicle body structure, incorporated in the front member 70 of the side frame 52, is effective to increase not only the mechanical strength but also the shock resistance of the motor vehicle body.

The bracket 51 may be made of metal such as aluminum, iron, stainless steel, or the like, or synthetic resin or reinforced plastic.

Another pair of side plates may be attached to the base plate 61 of the bracket 51, and an engine may be installed on these side plates. The principles of the present invention may be applied to not only the component attachments on the front member 70 of the side frame 52, but also other component attachments.

With the present invention, as described above, the motor vehicle body structure allows the motor vehicle to be reduced in weight and manufactured with increased productivity, and increases the rigidity of the motor vehicle body for increased resistance to shocks induced by external forces applied in various directions and also for increased mechanical strength of component attachments.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A motor vehicle body structure comprising:
   a pair of side frames each comprising a core layer having opposite surfaces and a pair of outer skin layers covering said opposite surfaces;
   a motor vehicle component; and
   joint means connected between said side frames and said motor vehicle component, for joining said motor vehicle component to said side frames through surface-to-surface contact therebetween, said joint means having surfaces joined in overlapping relation to surfaces of said side frames.

2. A motor vehicle body structure according to claim 1, wherein said side frames have integral protrusions extending laterally inwardly therefrom, said joint means having surfaces joined in overlapping relation to surfaces of said protrusions.

3. A motor vehicle body structure according to claim 2, wherein each of said side frames comprises a front pillar, a front member connected to said front pillar through a front boundary region, a rear pillar, and a rear member connected to said rear pillar through a rear boundary region, said protrusions being positioned in said front and rear boundary regions, respectively.

4. A motor vehicle body structure according to claim 2, wherein said protrusions are formed in the core layer and the laterally inward outer skin layer of each said side frame.

5. A motor vehicle body structure according to claim 1, wherein said core layer is made of foamed plastic and said outer skin layers are made of fiber-reinforced plastic.

6. A motor vehicle body structure according to claim 1, wherein said joint means comprises a bracket having a base plate having a joint surface which is complementary in shape to a surface of one of said side frames, and a plurality of component attachments mounted on said base plate, and said body structure further includes a plurality of motor vehicle components mechanically installed on said component attachments, respectively.

7. A motor vehicle body structure according to claim 6, wherein each of said component attachments comprises a pair of spaced side plates attached perpendicularly to said base plate and having respective attachment holes, said motor vehicle components being installed on said component attachments through said attachment holes.

8. A motor vehicle body structure according to claim 6, wherein said base plate has a plurality of attachment holes defined in a portion thereof, said base plate being spaced from said surface of said one of the side frames at said portion, said motor vehicle components being fastened directly to said base plate by fasteners extending through said attachment holes of said base plate.

9. A motor vehicle body structure according to claim 6, wherein said bracket is fixed to said surface of said one of the side frames by adhesive bonding and a fastener.

10. A motor vehicle body structure comprising:
    a pair of side frames each comprising ac ore layer having opposite surfaces and a pair of outer skin layers covering said opposite surfaces;
    a motor vehicle component;
    joint means disposed between said side frames and said motor vehicle component, for joining said motor vehicle component to said side frames through surface-to-surface contact therebetween;
    said side frames having integral protrusions extending laterally therefrom;
    said joint means being joined to surfaces of said protrusions; and
    said joint means comprising a pair of holders having joint surfaces which are complementary in shape to said surfaces of said protrusions, said motor vehicle component comprising a connector extending between and interconnecting said holders, whereby said side frames are connected to each other by said holders and said connector.

11. A motor vehicle body structure comprising:
    a pair of side frames each comprising a core layer having opposite surfaces and a pair of outer skin layers covering said opposite surfaces;
    a motor vehicle component;
    joint means connected between said side frames and said motor vehicle component, for joining said motor vehicle component to said side frames through surface-to-surface contact therebetween;
    said side frames having integral protrusions extending laterally therefrom;
    said joint means being joined to surfaces of said protrusions; and
    said protrusions being frustoconical in shape and projecting laterally from side surfaces of said side frames, respectively.

12. A motor vehicle body structure comprising:
a pair of side frames each comprising a sandwiched structural body having a core section and a pair of outer skin layers bounding said core section;
a motor vehicle component; and
joint means connected between said side frames and said motor vehicle component, for joining said motor vehicle component to said side frames through surface-to-surface contact therebetween, said joint means having surfaces joined in overlapping relation to surfaces of said side frames.

13. A motor vehicle body structure comprising:
a pair of side frames each comprising a core layer having opposite surfaces and a pair of outer skin layers covering said opposite surfaces;
joint means connected between said side frames through surface-to-surface contact therebetween for increasing the rigidity of said side frames against torsional and bending stress;
said side frames having integral protrusions extending laterally inwardly therefrom; and
said joint means having surfaces joined in overlapping relation to surfaces of said protrusions.

14. A motor vehicle body structure according to claim 13, wherein said core layer is made of foamed plastic, said outer skin layers and said joint means are formed of plastic, and said overlapping surfaces are bonded together with adhesive.

15. A motor vehicle body structure according to claim 14, wherein said joint means comprises a pair of holders having joint surfaces which are complementary in shape to said surfaces of said protrusions and a connector extending between said interconnecting said holders.

16. A motor vehicle body structure according to claim 14, wherein said protrusions are frustoconical in shape and project laterally from side surfaces of said side frames, respectively.

17. A motor vehicle body structure according to claim 14, wherein each of said side frames comprises a front pillar, a front member connected to said front pillar through a front boundary region, a rear pillar, and a rear member connected to said rear pillar through a rear boundary region, said protrusions being positioned in said front and rear boundary regions, respectively.

18. A motor vehicle body structure comprising:
a side frame comprising a core layer having a opposite surfaces and a pair of outer skin layers covering said opposite surfaces;
bracket means for joining a plurality of motor vehicle components to said side frame;
said bracket means comprising a bracket with a base plate having a joint surface which is complementary in shape and joined to a surface of said side frame, and a plurality of component attachments mounted on said base plate;
a plurality of motor vehicle components mechanically installed on said component attachments, respectively;
each of said component attachments comprising a pair of spaced side plates attached perpendicularly to said base plate and having respective attachment holes; and
said motor vehicle components being installed on said component attachments through said attachment holes.

19. A motor vehicle body structure according to claim 18, wherein said bracket is fixed to said surface of said side frame by adhesive bonding and a fastener.

20. A motor vehicle body structure comprising:
a side frame comprising a core layer having a opposite surfaces and a pair of outer skin layers covering said opposite surfaces;
bracket means for joining a plurality of motor vehicle components to said side frame;
said bracket means comprising a bracket with a base plate having a joint surface which is complementary in shape and joined to a surface of said side frame, and a plurality of component attachments mounted on said base plate;
a plurality of motor vehicle components mechanically installed on said component attachment, respectively;
said base plate having a plurality of attachment holes defined in a portion thereof, said base plate being spaced from said surface of said frame at said portion, and said portion being separate from said joint surface; and
at least one of said motor vehicle components being fastened directly to said base plate by fasteners extending through said attachment holes of said base plate.

* * * * *

UNITED STATES PATENT AND TRADEMARK OFFICE
CERTIFICATE OF CORRECTION

PATENT NO. : 5,195,779
DATED : March 23, 1993
INVENTOR(S) : Aoyama et al.

It is certified that error appears in the above-identified patent and that said Letters Patent is hereby corrected as shown below:

Column 4, line 31, change "i" to --in--;

Column 4, line 55, change "4" to --4, 5--.

Column 8, line 34 (claim 10, line 2), change "ac ore" to --a core--.

Column 10, line 1 (claim 18, line 2), delete "a" (third occurrence)

Column 10, line 25 (claim 20, line 2), delete "a" (third occurrence)

Column 10, line 40 (claim 20, line 17), after "said" (second occurrence), insert --side--.

Signed and Sealed this

Sixteenth Day of November, 1993

Attest:

BRUCE LEHMAN

*Attesting Officer*        *Commissioner of Patents and Trademarks*